US012160065B2

(12) United States Patent
Wen

(10) Patent No.: US 12,160,065 B2
(45) Date of Patent: Dec. 3, 2024

(54) CONNECTOR HOUSING MODULE WITH A SEALING RING AND CONNECTOR HOUSING COMPRISING SUCH A CONNECTOR HOUSING MODULE

(71) Applicant: HARTING ELECTRIC GMBH & CO. KG, Espelkamp (DE)

(72) Inventor: Shao Wei Wen, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 325 days.

(21) Appl. No.: 17/627,575

(22) PCT Filed: Jul. 10, 2020

(86) PCT No.: PCT/DE2020/100606
§ 371 (c)(1),
(2) Date: Jan. 14, 2022

(87) PCT Pub. No.: WO2021/008656
PCT Pub. Date: Jan. 21, 2021

(65) Prior Publication Data

US 2022/0278482 A1 Sep. 1, 2022

(30) Foreign Application Priority Data

Jul. 18, 2019 (CN) ........................ 201910648572.3

(51) Int. Cl.
*H01R 13/52* (2006.01)
*H01R 13/6581* (2011.01)
(Continued)

(52) U.S. Cl.
CPC ......... *H01R 13/5202* (2013.01); *H01R 13/52* (2013.01); *H01R 13/6581* (2013.01);
(Continued)

(58) Field of Classification Search
CPC .......................... H01R 13/5202; H01R 13/52; H01R 13/6581; H01R 13/502; H01R 13/516; H01R 13/53; H01R 13/533; H01R 13/648
See application file for complete search history.

(56) References Cited

U.S. PATENT DOCUMENTS

2011/0230086 A1* 9/2011 Fujiwara ............ H01R 13/6584
439/559

FOREIGN PATENT DOCUMENTS

CN 203445306 U 2/2014
CN 104577477 A 4/2015
(Continued)

OTHER PUBLICATIONS

European Patent Office, International Search Report and Written Opinion for international application No. PCT/DE2020/100606, mailed Sep. 30, 2020, 11 pages (with English translation of International Search Report).

*Primary Examiner* — Justin M Kratt
(74) *Attorney, Agent, or Firm* — Seed IP Law Group LLP

(57) ABSTRACT

Disclosed is a connector housing module which comprises a housing body having a housing body end region, which surrounds an opening in said housing body, and having a sealing ring, a lateral face of said housing body end region being in detent engagement with a lateral face of the sealing ring. A connector housing is also disclosed. The connector housing comprises a connector housing module and a hood, wherein an end face of the hood surrounding an opening in said hood, when the hood and the housing body are in a closed state, in part directly contacts an end face of the housing body end region and in part presses a curved edge of a bulge of the sealing ring so that the bulge is completely interlockingly engaged with a recess of the housing body,
(Continued)

thereby improving the electromagnetic shielding capacity and the water tightness of the entire connector housing.

10 Claims, 5 Drawing Sheets

(51) Int. Cl.

| | |
|---|---|
| *H01R 13/502* | (2006.01) |
| *H01R 13/516* | (2006.01) |
| *H01R 13/53* | (2006.01) |
| *H01R 13/533* | (2006.01) |
| *H01R 13/648* | (2006.01) |

(52) U.S. Cl.
CPC .......... *H01R 13/502* (2013.01); *H01R 13/516* (2013.01); *H01R 13/53* (2013.01); *H01R 13/533* (2013.01); *H01R 13/648* (2013.01)

(56) References Cited

FOREIGN PATENT DOCUMENTS

| | | | | | |
|---|---|---|---|---|---|
| CN | 105375188 | A | * | 3/2016 | ............. H01R 13/52 |
| DE | 295 05 601 | U1 | | 5/1995 | |
| EP | 2 367 236 | A1 | | 9/2011 | |
| EP | 3 382 816 | A1 | | 10/2018 | |
| JP | H03219578 | A | | 9/1991 | |

* cited by examiner

CONNECTOR HOUSING MODULE WITH A SEALING RING AND CONNECTOR HOUSING COMPRISING SUCH A CONNECTOR HOUSING MODULE

BACKGROUND

Technical Field

The present disclosure relates to a connector housing module and a connector housing comprising a connector housing module of this kind.

Description of the Related Art

The housing of a high-load connector should not only exhibit a defined electromagnetic shielding capability, but also a defined water tightness. For example, it should satisfy an IP67 protection rating or similar industry rating for water tightness.

In order to satisfy the above requirement, an electrical intermediate connecting element, for example a metal frame, is provided between a first housing body and a second housing body of the connector housing. Although the connector housing is thereby able to fulfil the defined requirement in terms of electromagnetic shielding, it is scarcely possible for the requirement in terms of water tightness to be met in this way. As an alternative to this, a rubber sealing ring is provided between the first housing body and the second housing body, the surface of which sealing ring is usually greater in the transverse direction than the corresponding surface of the first housing body and of the second housing body, however, which results in the end regions of the first housing body and of the second housing body not being in contact with one another, so that it is scarcely possible for the requirement in terms of the electromagnetic shielding capability to be observed.

BRIEF SUMMARY

One problem addressed by embodiments of the present invention is that of supplying a connector housing module which is characterized by electromagnetic shielding capability, water tightness, simple construction, and low costs, and a connector housing having a connector housing module of this kind.

According to a first aspect or embodiment of the present invention, a connector housing module is provided which comprises a housing body, wherein the housing body has a housing body end region which surrounds an opening in said housing body, and comprises a sealing ring, wherein a lateral face of the housing body end region is in detent engagement with a lateral face of the sealing ring. In an advantageous embodiment, it is provided that the exterior of the housing body end region can be in detent engagement with the exterior of the sealing ring. In another advantageous embodiment, it is provided that the interior of the housing body end region can be in detent engagement with the interior of the sealing ring.

In addition, it is provided that the housing body end region comprises a first recess, a second recess, and a shoulder arranged between the first recess and the second recess. In an advantageous embodiment, it is provided that an end face of the housing body end region has a stepped design.

In addition, it is provided that the sealing ring comprises a main body, a first protrusion arranged on one side of the upper region of the main body, a second protrusion arranged on one side of the lower region of the main body, and a sealing groove arranged between the first protrusion and the second protrusion, wherein an upper end of the main body is located above the first protrusion. In an advantageous embodiment, it is provided that the main body forms the first protrusion and the second protrusion integrally with one another.

In addition, it is provided that the first protrusion may be in detent engagement with the first recess and the shoulder may be in detent engagement with the sealing groove.

In addition, it is provided that the first recess has a V-shaped cross section and an internal angle of the first protrusion has a V-shaped cross section, which corresponds to the V-shaped cross section of the first recess. In an advantageous embodiment, it is provided that the first protrusion has a trapezoidal design.

In addition, it is provided that the first protrusion has a curved edge opposite the internal angle, which edge extends upwardly until it merges with the upper end of the main body. In an advantageous embodiment, it is provided that in the case of the first protrusion which is in detent engagement with the first recess, the curved edge projects upwardly relative to the end face of the housing body end region.

In addition, it is provided that an internal angle of the shoulder has an inverted V-shaped cross section and the sealing groove has an inverted V-shaped cross section which corresponds to the inverted V-shaped cross section of the shoulder. In an advantageous embodiment, it is provided that the shoulder has a trapezoidal design.

In addition, it is provided that the second protrusion can be in detent engagement with the second recess. In an advantageous embodiment, it is provided that the second protrusion has a rectangular design, and the second recess has a rectangular shape which corresponds to the rectangular form of the second protrusion.

In addition, it is provided that the exterior of the second protrusion is offset inwardly relative to the exterior of the first protrusion by a given interval, so that the exterior of the second protrusion and the exterior of the first protrusion form a stepped structure.

According to another aspect or embodiment of the present invention, a connector housing is supplied, which comprises a connector housing module according to the first aspect or embodiment of the invention described above and a hood, wherein an end face of the hood surrounds an opening in said hood, when the hood and the housing body are in a closed state, is partially in direct contact with an end face of the housing body end region, and partially presses the curved edge of the first protrusion, so that the first protrusion is completely in form-fitting engagement with the first recess. In an advantageous embodiment, it is provided that when the first protrusion is completely in form-fitting engagement with the first recess, the upper end of the main body of the sealing ring partially surrounds the hood with its lateral part.

An electrical intermediate connecting element can be dispensed with in the above embodiment according to the invention, thanks to the direct electrical contact between the hood and the housing body which results in an increase in the electromagnetic screening capability of the entire connector. Furthermore, the water tightness of the entire connector housing is increased by the sealing ring, which is pressed between the end face of the hood and the housing body end region and surrounds the boundary surface between the hood and the housing body. In addition, the pressing surface of the sealing ring is enlarged thanks to the V-shaped design, which not only guarantees water tightness, but prevents the sealing ring from springing out when the connector housing is closed. Due to the form-fitting engagement between the second protrusion of the sealing ring and the second recess of the housing body end region, no adhesive need be used to adhere the sealing ring, which helps reduce costs. Thanks to the stepped design of the sealing ring, it functions as an assembly aid, as a result of which assembly is made easier.

BRIEF DESCRIPTION OF THE SEVERAL VIEWS OF THE DRAWINGS

Further advantages and features can be derived from the following description with reference being made to the attached drawings.

DETAILED DESCRIPTION

The design according to the invention is dealt with in greater detail below with the help of an exemplary embodiment with reference being made to the attached drawings. In the description, the same or similar reference signs stand for the same or similar parts. The following description of the embodiment according to the invention, with reference being made to the attached drawings, serves to explain the basic ideas behind the present invention and should in no way be seen as limiting the invention.

Figure 1:
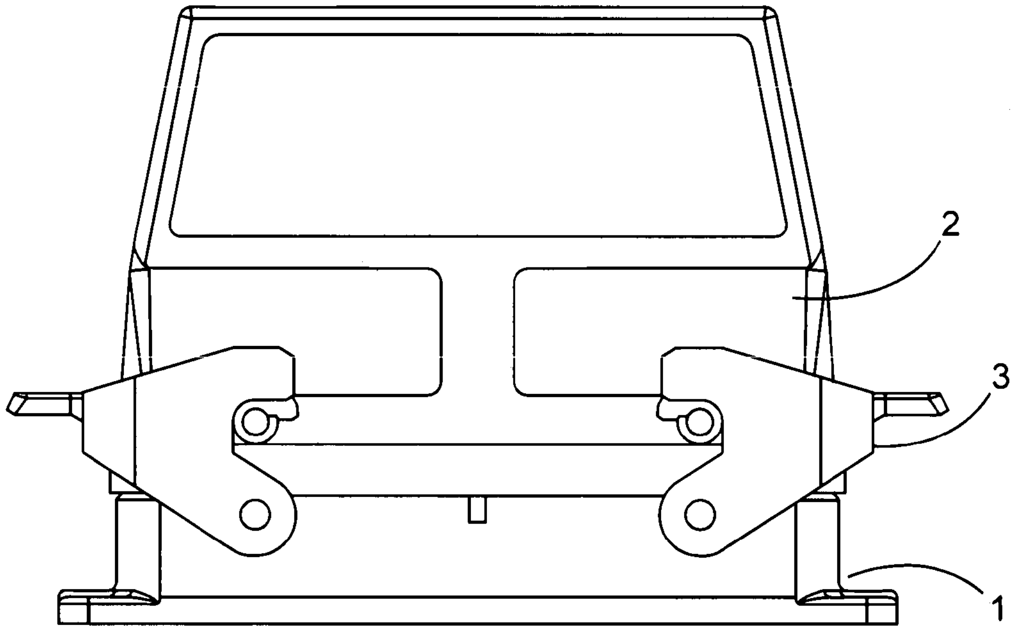
FIG. 1 shows a connector housing according to an embodiment of the present invention during use.

FIG. 1 shows a connector housing according to an embodiment of the present invention during use.

Figure 2:
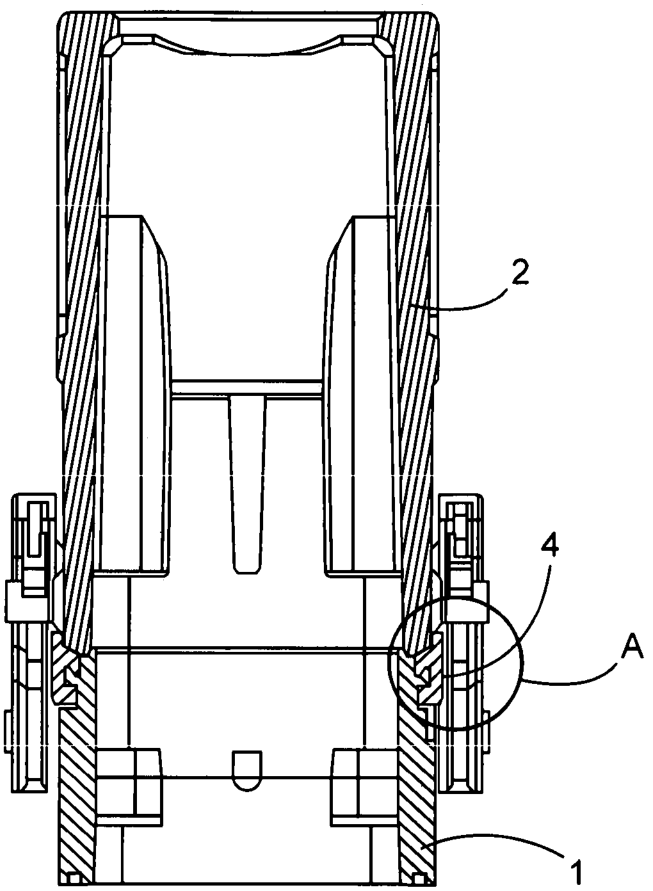
FIG. 2 shows a connector housing according to an embodiment of the present invention as a sectional depiction.

As emerges from FIG. 1, the connector housing comprises a housing body 1, a hood 2, a locking mechanism 3 arranged on a first lateral wall 15 (FIG. 4) of the housing body 1, which locking mechanism is used for locking the housing body 1 and the hood 2 in a closed state, and a sealing ring 4 (FIG. 2) which is arranged on the housing body 1 and is located between the housing body 1 and the hood 2 in the closed state (see FIG. 2). In one embodiment, the housing body 1 and the sealing ring 4 arranged thereon form a connector housing module. In one embodiment, both the housing body 1 and the hood 2 are produced from an electrically conductive material, for example from a metal.

Figure 3:
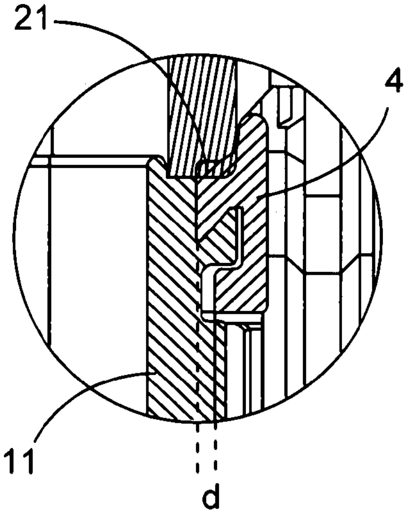
FIG. 3 shows area A of the connector housing according to the embodiment of the invention in accordance with FIG. 2 as an enlarged representation.

FIG. 2 shows a connector housing as a sectional representation along the longitudinal direction. FIG. 3 shows area A in accordance with FIG. 2 as an enlarged representation.

Figure 4:
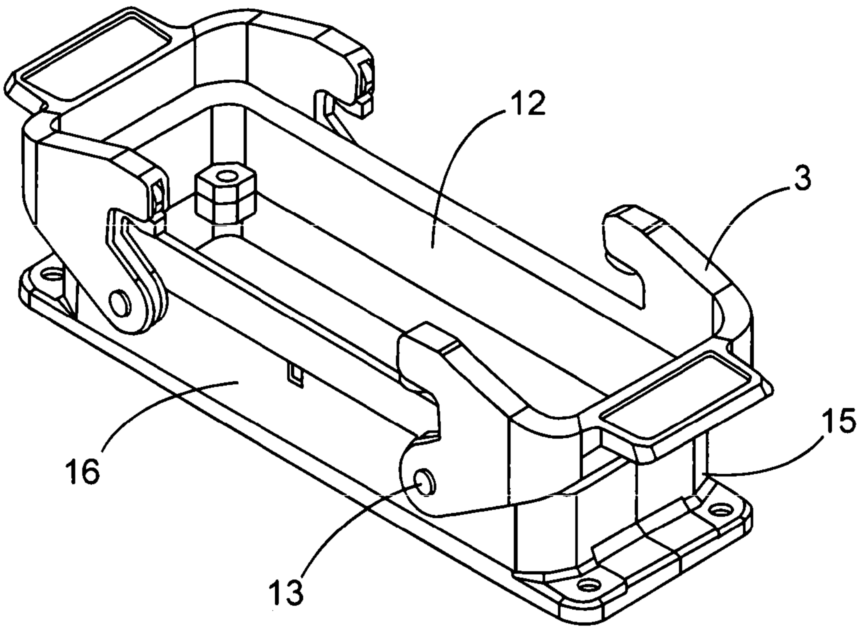
FIG. 4 shows a connector housing subassembly according to an embodiment of the present invention as a three-dimensional representation.

As can be inferred from FIG. 2, the housing body 1 has a housing body end region 11 which surrounds an opening 12 in said housing body 1, wherein the housing body end region 11 corresponds to the part of the housing body 1 situated above a pin 13 (FIG. 4). The hood 2 has an end face 21 surrounding an opening in said hood 2. If the hood 2 and the housing body 1 are in the closed state, the end face 21 of the hood 2 makes partial contact, in other words with the left region according to FIG. 3, with the end face of the housing body end region 11 of the housing body 1, so that through direct contact between the housing body 1 and the end face 21 of the hood 2, an electrical connection is created and the electromagnetic shielding function is thereby satisfied. Furthermore, the end face 21 of the hood 2 presses and makes partial contact, in other words with the right region according to FIG. 3, with an end face of the sealing ring 4, which sealing ring 4 also partially surrounds a side face of the housing body 1 and of the hood 2, in particular the exterior of the contact region of the housing body end region 11 and the end region of the hood 2, in order to seal the exterior and thereby satisfy the water protection function.

Figure 5:
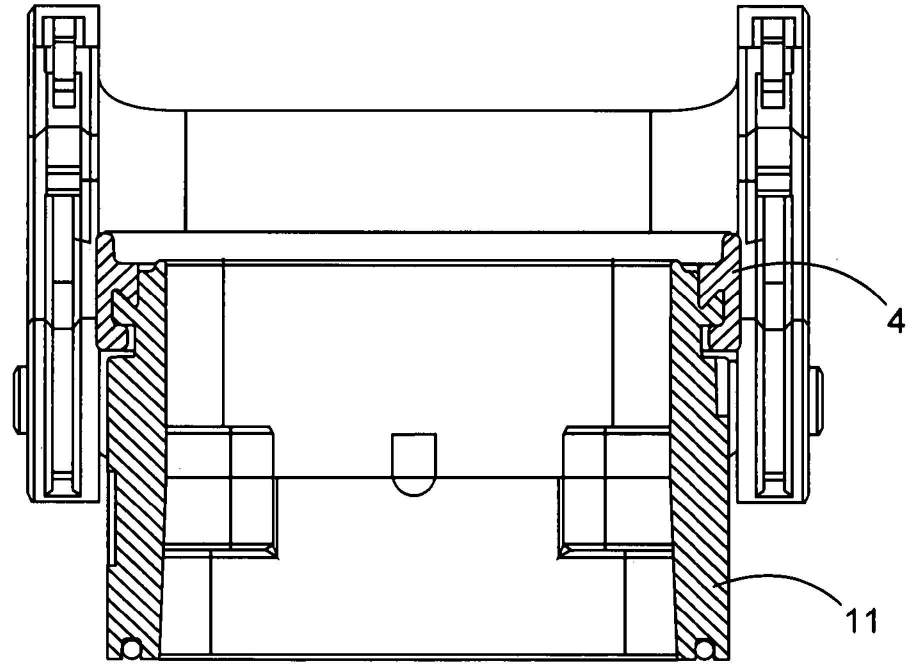
FIG. 5 shows the connector housing module in accordance with FIG. 4 as a sectional representation.

The connector housing module, which comprises a housing body 1, a sealing ring 4 in detent engagement with the housing body end region 11 of the housing 1, and a locking mechanism 3 arranged on a first lateral wall 15 of the housing body 1, is looked at in greater detail making reference to FIG. 4 and FIG. 5. The detent engagement of a lateral face of the housing body end region 11 with a lateral face of the sealing ring 4, specifically through the detent engagement of the exterior of the housing body end region 11 with the interior of the sealing ring 4, means that the separation of the sealing ring 4 along the longitudinal direction in accordance with FIG. 5, in other words, along the top-bottom direction of the housing body end region 11, is precluded. Although the sealing ring 4 is located on the exterior of the housing body end region 11, as depicted in the drawings, it is conceivable in another embodiment, however, for the sealing ring 4 also to be arranged on the interior of the housing body end region 11, and therefore for the interior of the housing body end region to be in detent engagement with the exterior of the sealing ring 4.

Figure 6:
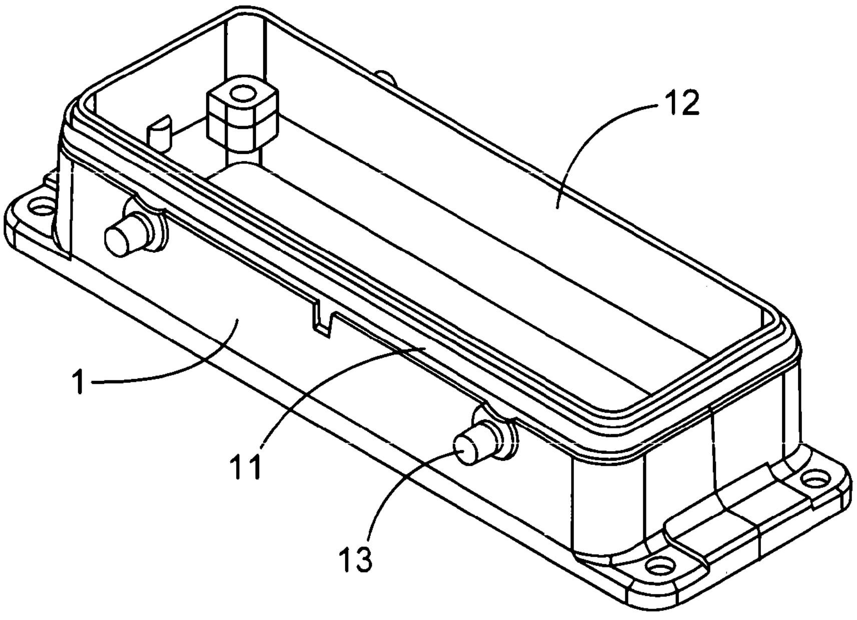
FIG. 6 shows a housing body according to an embodiment of the present invention as a three-dimensional representation.
Figure 7:
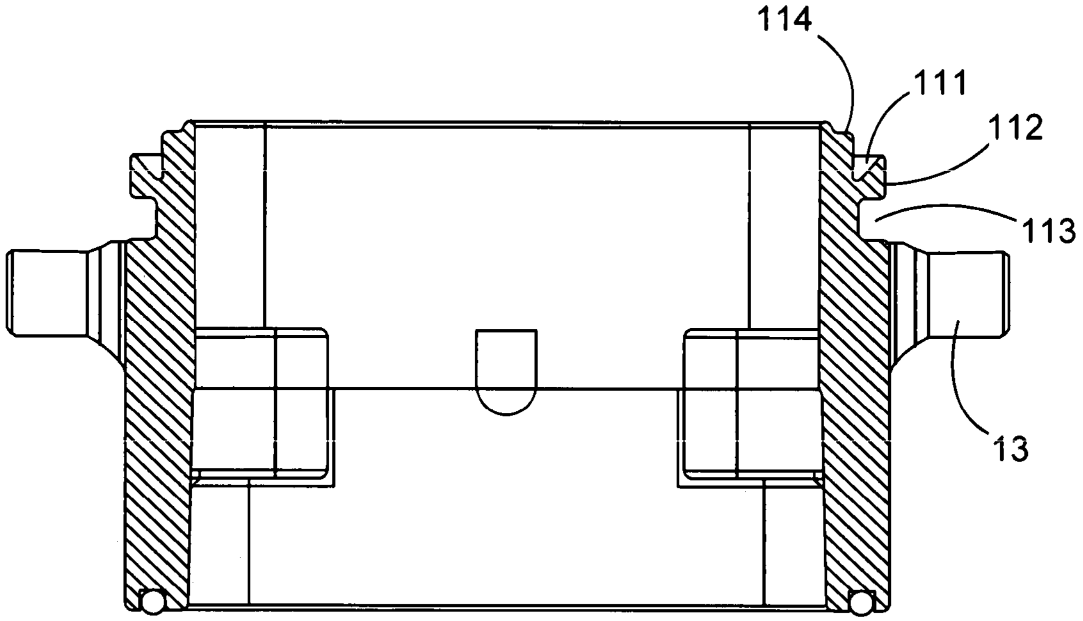
FIG. 7 shows the housing body in accordance with FIG. 6 as a sectional representation.

The specific design of the housing body 1 is dealt with in greater detail below making reference to FIG. 6 and FIG. 7. The housing body 1 has a substantially rectangular design overall and comprises two first lateral walls 15, which are opposite one another, and two second lateral walls 16, which are opposite one another. The exterior of the housing body end region 11 of the housing body 1 has a polygonal form and is inwardly offset relative to the lateral wall, for example the exterior of the first lateral wall 15. In another embodiment, it may be provided that the interior of the housing body end region has a polygonal form and is offset inwardly relative to the lateral wall, for example the interior of the first lateral wall 15. As results from the sectional view of the housing body according to FIG. 7, a first recess 111 with a V-shaped cross section, a second recess 113 with a rectangular cross section, and a shoulder 112 arranged between the first recess 111 and the second recess 113, which shoulder 112 is substantially trapezoidal in design, are provided circumferentially on the exterior of the housing body end region 11. In this case, an internal angle of the trapezoidal form, which is an alternate angle of an angle of the V-shaped cross section of the first recess 111, has an inverted V-shaped cross section. The shoulder 112 may of course also have a different form. The housing body end region 11 may, in addition, comprise an end surface 114, which may have a trapezoidal design and is used for receiving the assigned end face 21 of the end region of the hood 2. In one embodiment, the first recess 111 is situated above the second recess 113 in the longitudinal direction. The side of the V-shape of the first recess 111 located on the exterior is shorter than the side located on the interior, in order to facilitate insertion of the sealing ring 4. The angle enclosed by the shorter side and the horizontal axis of the horizontal plane is greater than 0 degrees, in order to prevent the sealing ring from separating from the end region of the housing body. Although, in accordance with FIG. 7, the side of the V-shape located on the interior runs parallel to the lateral wall of the housing body 1, this side need not run parallel to the lateral wall, however, meaning that alternatively to this, it may intersect with the lateral wall. The V-shape of the first recess 111 may have an angle which substantially corresponds to that of the inverted V-shape of the shoulder 112 or, alternatively, an angle that differs from this. Furthermore, despite the rectangular cross section in the embodiment according to FIG. 7, the second recess 113 may also have a different form as an alternative to this.

Figure 8:
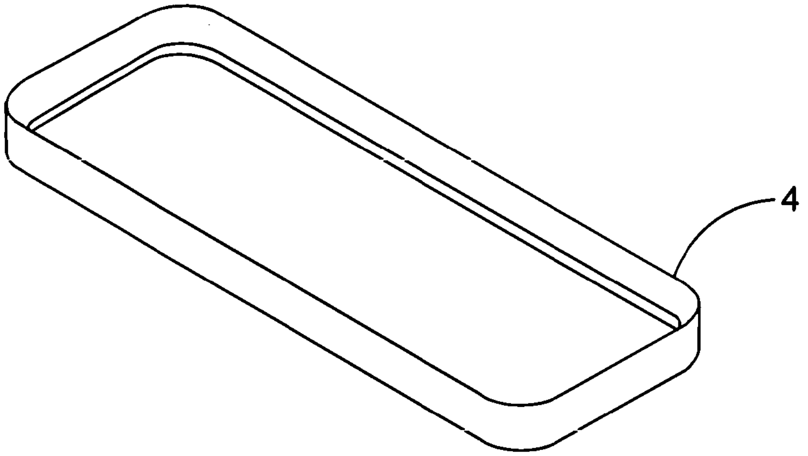
FIG. 8 shows a sealing ring according to an embodiment of the present invention as a three-dimensional representation.
Figure 9:
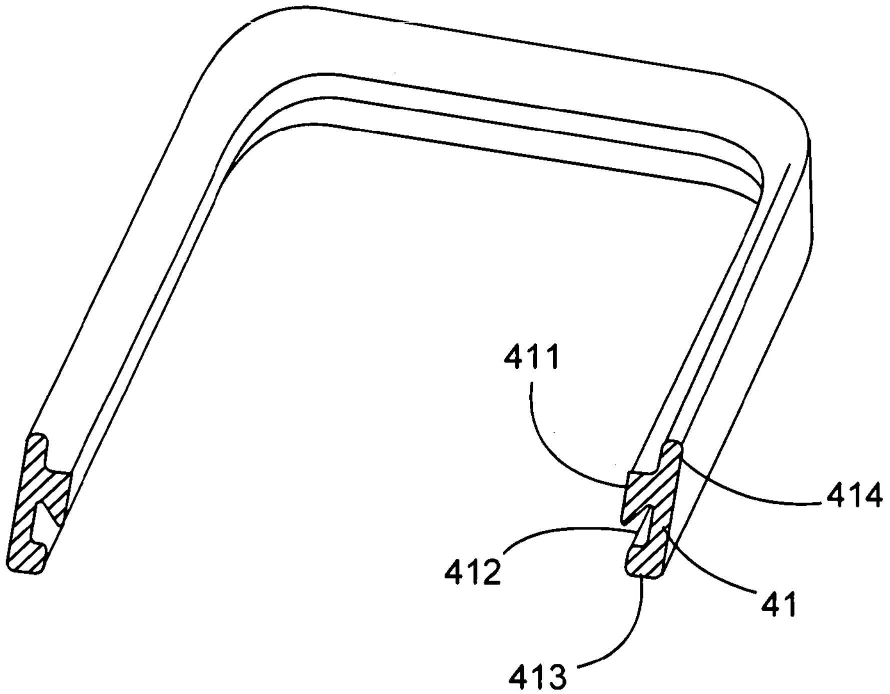
FIG. 9 shows the sealing ring in accordance with FIG. 8 as a sectional representation.

The specific design of the sealing ring 4 is dealt with in greater detail below making reference to FIG. 8 and FIG. 9. The sealing ring 4 has a substantially rectangular design and its interior has a polygonal contour, wherein the polygonal contour thereof matches the polygonal contour of the housing body end region 11. The sealing ring 4 comprises a main body 41, a first protrusion 411 arranged on one side (interior in the drawings) of the upper region of the main body 41, a second protrusion 413 arranged on one side (interior) of the lower region of the main body 41, and a sealing groove 412 arranged between the first protrusion 411 and the second protrusion 413. It is provided in one embodiment that the main body 41, the first protrusion 411, and the second protrusion 413 are integrally formed with one another. Both the first protrusion 411 and the second protrusion 413 extend towards the same side, starting from the main body 41, and the upper end 414 of the main body 41 is located above the first protrusion 411. As can be seen from the drawings, the first protrusion 411 has a substantially trapezoidal design, wherein an internal angle of the trapezoidal form has a V-shaped cross section, which corresponds to the V-shaped cross section of the first recess 111. An edge of the first protrusion 411 opposite the internal angle of the V-shaped cross section has a curved design and extends upwardly, until it merges with the interior of the upper end 414, so that the curved edge, along with the upper end, forms a receiving portion for receiving the end face 21 of the hood 2. It is evident that the first protrusion 411 may also have a different form. In the case of the first protrusion 411 which is in detent engagement with the first recess 111, the curved edge projects out upwardly relative to the end face 114 of the housing body end region 11. The side of the V-shape of the first protrusion 411 located on the interior is shorter than the side located on the exterior. Although the side of the V-shape located on the exterior according to FIG. 9 runs parallel to the exterior of the sealing ring 4, this side need not run parallel to the exterior, however, and alternatively to this it may intersect with the exterior. The V-shape of the first protrusion 411 may have an angle which substantially corresponds to that of the inverted V-shape of the sealing groove 412 or, alternatively to this, it may have an angle that differs from this. Furthermore, despite the rectangular cross section in the embodiment according to FIG. 9, the second protrusion 413 may also have a different shape, for example a trapezoidal shape, as an alternative to this. The exterior of the second protrusion 413 is offset inwardly relative to the exterior of the first protrusion 411 by a given interval, in order to form a step-shaped structure. In other words, there is an interval d (FIG. 3) between the two components in the transverse direction, in other words in the thickness direction of the sealing ring 4.

Reference is once again made to FIG. 5, wherein the assembly of the housing body end region 11 and of the sealing ring 4 is explained below. During assembly, the sealing ring 4 is initially pushed into the housing body end region 11 from above. The stepped structure, which is formed by the outer edge of the first protrusion 411 and the outer edge of the second protrusion 413, functions as an assembly aid for the sealing ring 4 and, in addition, a downwards movement of the sealing ring 4 is prevented by the shoulder 112 of the housing body end region 111. After this, the second protrusion 413 is displaced downwardly beyond the shoulder 112, on account of its elasticity, and the first protrusion 411 gradually slides into the first recess 111 in the housing body end region 11 and is therefore in detent engagement. At the same time, the shoulder 112 slides in the opposite direction into the sealing groove 412, wherein the shoulder 112 acts as a stop and prevents the sealing ring from sliding further downwards. The second protrusion 413 likewise slides beyond the shoulder 112, and finally into the second recess 113. Consequently, the housing body end region 11 is in detent engagement with the sealing ring 4, so that the sealing ring 4 cannot move in a vertical direction and the sealing ring 4 therefore engages with the housing body end region 11. The curved edge of the upper region of the first protrusion 411 of the sealing ring 4 projects out upwardly relative to the end face of the housing body end region 11, said first protrusion 411 not being completely in form-fitting engagement with the first recess 111 of the housing body end region 11. Since the second protrusion 413 is held fixedly in the second recess 113, and therefore in the housing body 1, the use of an adhesive is not required, which lowers costs. The pressing face of the sealing ring 4 is enlarged thanks to the V-shaped structure, which means that the IP protection rating of the sealing ring 4 is improved. As can be seen from FIG. 3, the end face 21 of the hood 2 is pressed downwards against the curved edge of the first protrusion 411 of the sealing ring 4 when the hood 2 is pressed on the housing body 1, so that due to the elastic deformation of the sealing ring 4, the first protrusion 411 is displaced further downwards, causing it to be completely in form-fitting engagement with the first recess 111. With a V-shaped structure of this kind, any springing of the sealing ring 4 out of the housing body end region 11 when it is under pressure is avoided. If the first protrusion 411 is completely in form-fitting engagement with the first recess 111, the upper end 414 of the main body 41 of the sealing ring 4 partially surrounds the hood 2 with its lateral part, in other words the exterior of the hood as in FIG. 3, in order to allow protection from water and dust penetration.

It will be clear to the person skilled in the art in this field that the present invention is in no way limited to the specifics of the exemplary embodiments given by way of example above, and, moreover, it can be realized in other concrete forms, without deviating from the fundamental idea or the underlying features of the invention. Accordingly, it is appreciated that various aspects of the embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A connector housing module removably couplable to a hood to form a connector housing, the connector housing module comprising:

a housing body, wherein the housing body has a housing body end region which surrounds an opening in said housing body, and a sealing ring, wherein an outer circumferential lateral face of the housing body end region, which faces outwardly away from the opening in said housing body, is in detent engagement with an inner circumferential lateral face of the sealing ring, which faces inwardly toward the opening in said housing body, and wherein an end face of the sealing ring and an end face of the housing body end region are arranged to collectively interface with a common end face of the hood to which the housing body is removably couplable.

2. The connector housing module as claimed in claim 1, wherein the housing body end region comprises a first recess, a second recess, and a shoulder arranged between the first recess and the second recess.

3. The connector housing module as claimed in claim 2, wherein the sealing ring comprises a main body, a first protrusion arranged on one side of an upper region of the main body, a second protrusion arranged on one side of a lower region of the main body, and a sealing groove arranged between the first protrusion and the second protrusion, wherein an upper end of the main body of the sealing ring is located above the first protrusion.

4. The connector housing module as claimed in claim 3, wherein the first protrusion is in detent engagement with the first recess and the shoulder is in detent engagement with the sealing groove.

5. The connector housing module as claimed in claim 4, wherein the second protrusion is in detent engagement with the second recess.

6. The connector housing module as claimed in claim 3, wherein the first recess has a V-shaped cross section and an internal angle of the first protrusion has a V-shaped cross section, which corresponds to the V-shaped cross section of the first recess.

7. The connector housing module as claimed in claim 6, wherein the first protrusion has a curved edge opposite the internal angle, which edge extends upwardly until it merges with the upper end of the main body.

8. The connector housing module as claimed in claim 3, wherein an internal angle of the shoulder has an inverted V-shaped cross section and the sealing groove has an inverted V-shaped cross section which corresponds to the inverted V-shaped cross section of the shoulder.

9. The connector housing module as claimed in claim 3, wherein an exterior of the second protrusion is offset inwardly relative to an exterior of the first protrusion by a given interval, so that the exterior of the second protrusion and the exterior of the first protrusion form a stepped structure.

10. A connector housing comprising:

a connector housing module including a housing body, wherein the housing body has a housing body end region which surrounds an opening in said housing body, and including a sealing ring with a first protrusion having a curved edge, wherein an outer circumferential lateral face of the housing body end region, which faces outwardly away from the opening in said housing body, is in detent engagement with an inner circumferential lateral face of the sealing ring, which faces inwardly toward the opening in said housing body; and a hood, wherein an end face of the hood which surrounds an opening in said hood, when the hood and the housing body are in a closed state, is partially in direct contact with an end face of the housing body end region, and partially in direct contact with an end face of the sealing ring to press the curved edge of the first protrusion of the sealing ring, so that the first protrusion is completely in form-fitting engagement with a first recess of the housing body.

* * * * *